United States Patent [19]
Garbe

[11] Patent Number: 5,071,041

[45] Date of Patent: Dec. 10, 1991

[54] VENDING MACHINE AND COMPONENTS

[75] Inventor: Manfred K. Garbe, Kitchener, Canada

[73] Assignee: Roboserve (Canada) Limited, Rexdale, Canada

[21] Appl. No.: 301,910

[22] Filed: Dec. 15, 1988

[30] Foreign Application Priority Data

Dec. 23, 1987 [CA] Canada .................................. 555315

[51] Int. Cl.$^5$ ............................................... G01F 11/00

[52] U.S. Cl. .................................... 222/405; 222/460; 222/464; 222/527; 222/529; 222/537

[58] Field of Search ............... 222/405, 460, 464, 526, 222/527, 529, 537, 544, 559, 564

[56] References Cited

U.S. PATENT DOCUMENTS

| | | | |
|---|---|---|---|
| 670,582 | 3/1901 | Erisman | 222/405 |
| 1,181,783 | 5/1916 | Lyons | 222/464 |
| 1,188,267 | 6/1916 | Girshefski et al. | 222/464 |
| 1,668,793 | 5/1928 | Wiggins | 222/464 X |
| 4,094,233 | 6/1978 | Martin . | |
| 4,143,589 | 3/1979 | Weber . | |
| 4,305,328 | 12/1981 | Kueser et al. . | |
| 4,433,617 | 2/1984 | Magnusson . | |
| 4,632,274 | 12/1986 | Garbe . | |
| 4,662,271 | 5/1987 | Woltermann . | |

FOREIGN PATENT DOCUMENTS 1056613 6/1979 Canada .

*Primary Examiner*—David H. Bollinger
*Attorney, Agent, or Firm*—Ivor M. Hughes; Neil H. Hughes

[57] ABSTRACT

A dunk valve mechanism is provided suitable for use in transferring fluids and fluidized material from storage. The mechanism includes a tube having an outlet and a mouth. The mouth of the tube is reciprocal from a position spaced from the fluid or fluidized material to a position submerged within the fluid or fluidized material. Also provided are devices (such as a motor in one example) to reciprocate the mouth of the tube from the position spaced from the fluid or fluidized material to the position submerged within the fluid or fluidized material.

21 Claims, 8 Drawing Sheets

FIG. 2.
PRIOR ART
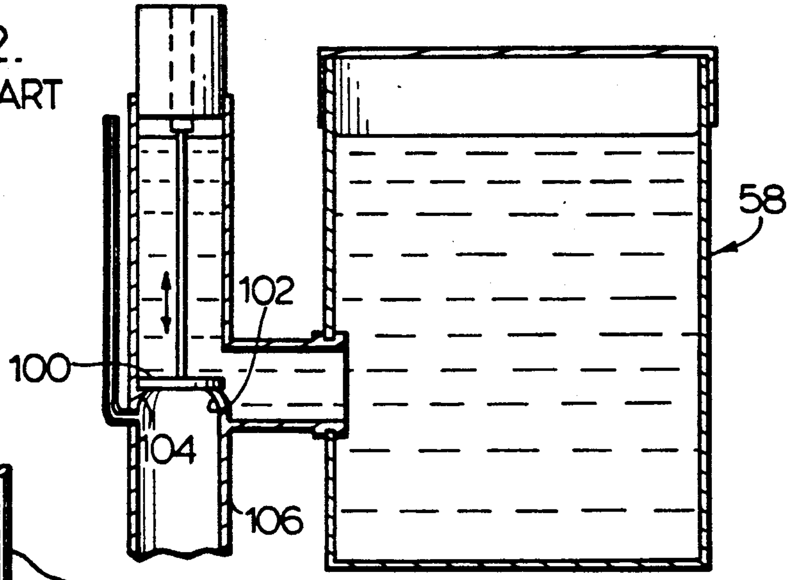
FIG. 3.
PRIOR ART
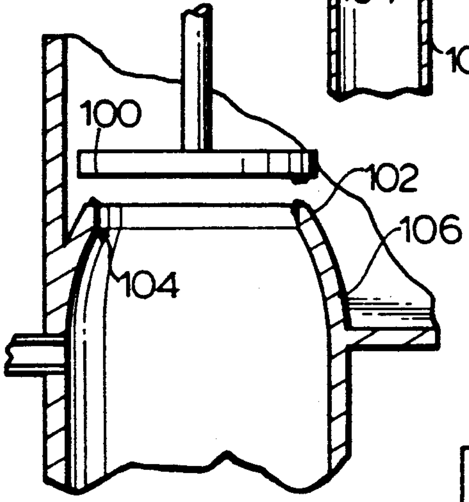
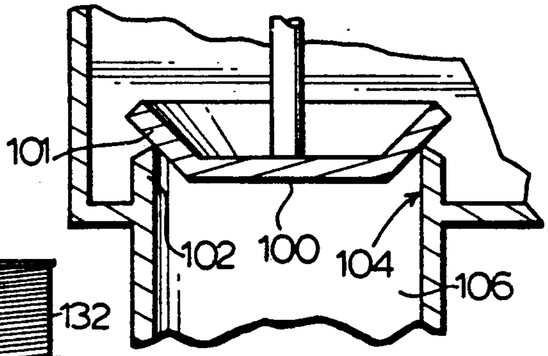
FIG. 4.
PRIOR ART
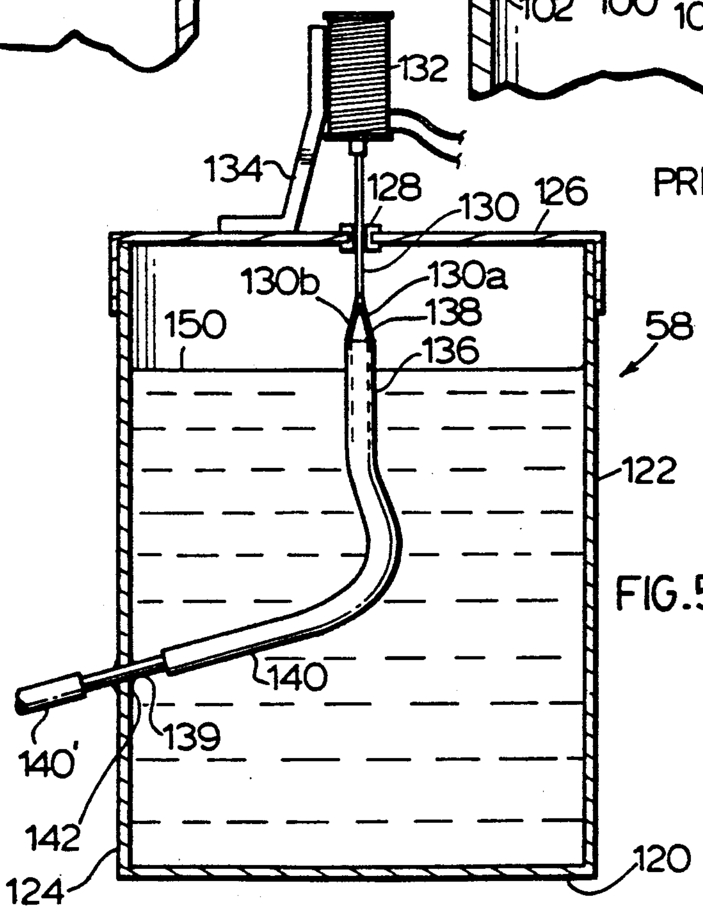
FIG. 5.

VENDING MACHINE AND COMPONENTS

FIELD OF INVENTION

This invention relates to a valve mechanism for transferring fluids and fluidized material from storage. In one application, this invention finds use in a hot water tank in a vending machine for dispensing hot beverages. Hot water in the tank may be discharged through the valve mechanism into a cup or product mixing bowl.

BACKGROUND OF INVENTION

Vending machines for dispensing hot beverages contain hot water tanks for heating water which is subsequently discharged through an outlet into a cup or product mixing bowl. In this regard, see U.S. Pat. 4,632,274. In such vending machines, the hot water tank may comprise a discharge carrying a seat covered by a seal reciprocated from a position covering the seat to a position spaced from the seat of the discharge permitting fluid to leave through the discharge from the hot water tank.

Controlled heating of water in the tank (by for example a heating element) causes precipitation of lime from the water which precipitates onto the seal, the discharge outlet walls or other surface inside the hot water tank. In some cases, the precipitated lime (grit) becomes lodged on top of the seat and between the seal and mouth of the discharge outlet degrading the seal, permitting water drip from the opening created between the seal and seat of the discharge—a notorious problem in the vending machine business particularly in humid areas.

In an attempt to overcome this problem, the shape of the seal was altered to carry a sloping peripheral sealing edge angled to the wall of the seat of the discharge so that the engagement of the sloped wall or edge of the seal on the seat creates a "wiping" action on the seat to remove the lime precipitate (grit) to ensure the seal the discharge outlet. Unfortunately, the proposal still permitted lime to precipitate.

Applicant is aware of the following patents—U.S. Pat. Nos. 4,094,233 (which corresponds to Canadian Patent 1,056,613), 4,143,589; 4,305,328; 4,433,617; and 4,662,271.

U.S. Pat. No. 4,094,233 (and Canadian Patent 1,056,613) teaches the shifting of the elevation of a collar 46 to adjust the shutoff water level 29 to vary the quantity of hot water that is transferred to the tank 18 for coffee brewing purposes.

U.S. Pat. No. 4,143,589 teaches the use of tube 26 adjustable for the purposes of the strength of coffee and the use of an air compressor which delivers air to a metering chamber to force heated water therefrom into the brewing chamber.

U.S. Pat. No. 4,305,328 teaches the use of an air compressor 17 for delivering compressed air via line 19 to the brewer to force brewed coffee from the brewer through line 13 to mixing bowl 11 and lifting of a line 13 (e.g. portion 13*a*) higher than that of screen 57 to half the flow.

U.S. Pat. No. 4,433,617 teaches the shutting off of an outlet pipe by a shutoff device.

U.S. Pat. No. 4,662,271 teaches the use of permanent magnet to move a sealing lid or cone 21 to provide an annular gap through which the water can flow.

While the above relate to coffee brewers and components, none deal with the problems created by the precipitation of lime (grit) destroying seals. Nor is Applicant aware of any solution that has overcome the problem of lime precipitation and the destruction of the seal of the discharge outlet.

It is therefore an object of the invention to provide an improved valve mechanism for transferring fluids or fluidized material from storage which when deactivated precludes the fluid or fluidized material from further discharge and overcomes the eventual "dripping" problem.

It is a further object of the invention to provide such valve mechanism which is easily manufactured, mounted and is reasonable in cost.

It is a further object of the invention to provide a vending machine for dispensing hot beverages which comprises such valve mechanism.

It is a further object of the invention which permits the discharge to be evacuated of water when water is precluded from entering the discharge.

It is a further object of the invention to provide a valve mechanism in a vending machine whose useful life does not depend on the hardness (lime content) of the water at the location of the machine.

Further and other objects of the invention will be realized by those skilled in the art from the following summary of the invention and detailed description of embodiments thereof.

SUMMARY OF INVENTION

According to one aspect of the invention a dunk valve mechanism is provided suitable for use for transferring fluids and fluidized material from storage, the mechanism comprising a tube having an outlet and supporting a mouth, the mouth reciprocal from a position wherein fluid or fluidized material is precluded from entering the mouth (for example spaced from the fluid or fluidized material) to a position wherein the fluid or fluidized material enters the mouth (for example submerged within the fluid or fluidized material) as the case may be, and means to reciprocate the mouth (for example a motor) from the position wherein the fluid or fluidized material is precluded from entering the mouth (for example spaced from the fluid or fluidized material) to the position wherein the fluid or fluidized material enters the mouth (for example submerged within the fluid or fluidized material), the outlet being spaced lower or below the mouth when the mouth is submerged within the fluid or fluidized material, the mouth in one embodiment oriented in a vertical direction, in another embodiment oriented to open laterally, the tube preferably comprising a flexible material in at least a portion thereof (for example a silicon tube) so that submerging of the mouth displaces a portion of the tube without affecting the flow of fluid or fluidized material (as the case may be) from the mouth to the outlet, preferably the flow of fluid or fluidized material being accomplished using gravity with fluid or fluidized material entering the mouth and exiting from the outlet at a position lower than the mouth. When the mouth is lifted out of the fluidized material, the flow stops and the tube becomes evacuated.

According to another aspect of the invention, a vending machine is provided for delivering hot beverages, the vending machine comprising a hot water tank, the hot water tank comprising means to heat the water and a dunk valve mechanism previously described.

According to another aspect of the invention, the tube may include in its length a collapsible or "accordion" section which when the mouth is submerged collapses on itself and expands or elongates when the mouth is raised from the fluid or fluidized material.

According to another aspect of the invention, magnetic material may be secured to the tube and magnetic means (e.g. electromagnet may be provided to cause the magnetic material to be moved thus causing movement of the tube in a predetermined manner to reciprocate the mouth of the tube from a position spaced from the fluid or fluidized material to a submerged position. Such system may be useful where the hot water tank of a vending machine is to have minimal components passing through the walls thereof.

According to another aspect of the invention, means are provided when the mouth of the tube is reciprocated to a submerged position, and the means for reciprocating the mouth of the tube cannot return the mouth to a raised position out of the fluid or fluidized material, for automatically raising the tube mouth in the event the means for reciprocating the mouth of the tube cannot return the mouth to a raised position. For example a spring may be provided secured to the mouth (either directly or indirectly for example through an arm) which constantly urges the mouth to be raised from the fluid or fluidized material and for example motor means must lift the mouth against the action of the spring.

According to another aspect of the invention, the dunk valve mechanism may float on the surface of the fluid or fluidized material and the mouth may be "dunked" from the floating position on the surface of the fluid or fluidized material.

According to another aspect of the invention, the mouth of the tube may be disposed to open laterally.

In some instances, it may be necessary to submerge the mouth quickly. In others, the mechanism may submerge the mouth quickly. In this event, it may be preferable to have the mouth so oriented to protect it from the creation of for example a vortex in the fluid by the quick submerging of the mouth by the mechanism (for example solenoid). The vortex may cause the water to flow in such a way that water and air are passed into the mouth.

Thus, according to another aspect of the invention, the mouth may be protected (to minimize effects of any vortex in the fluid introduced into the mouth). For example a "mushroom shaped top" overlying the mouth and spaced therefrom may be suitable as may other structures shown herein.

The only criteria is that where the creation of vortexes are of concern, the mouth is protected.

BRIEF DESCRIPTION OF THE DRAWINGS

The invention and prior art structures will be described with reference to the following drawings in which:

FIGS. 2, 3 and 4 are side cross-sectional views taken through known seals and seats of discharge outlets in hot water tanks according to the prior art.

FIG. 5 is a side view of a dunk valve mechanism used in the hot water tank of the vending machine according to an embodiment of the invention.

FIGS. 14 to 21 inclusive illustrate various configurations carrying mouths to be submerged which are protected and which may be suitable for use where the creation of a vortex is of concern.

FIG. 14 illustrates the use of a mouth oriented vertically and protected vertically.

FIG. 15 illustrates the use of a mouth opening laterally and protected from above.

FIGS. 16 and 16A (shown in top view in FIG. 16A) illustrates the use of a mouth which is segmented.

FIGS. 17 and 17A (shown in top view in FIG. 17A) illustrates the use of a mouth consisting of four laterally directed openings, opening at 90° to the opening next adjacent.

FIG. 18 illustrates the use of a mouth consisting of two laterally directed openings, opening in opposite directions to one another.

FIG. 19 illustrates the use of a mouth carrying a protective cover (disk or mushroom shaped structure) spaced a predetermined distance thereabove.

FIG. 20 illustrates the use of another mouth.

DETAILED DESCRIPTION OF EMBODIMENTS

Figure 1:
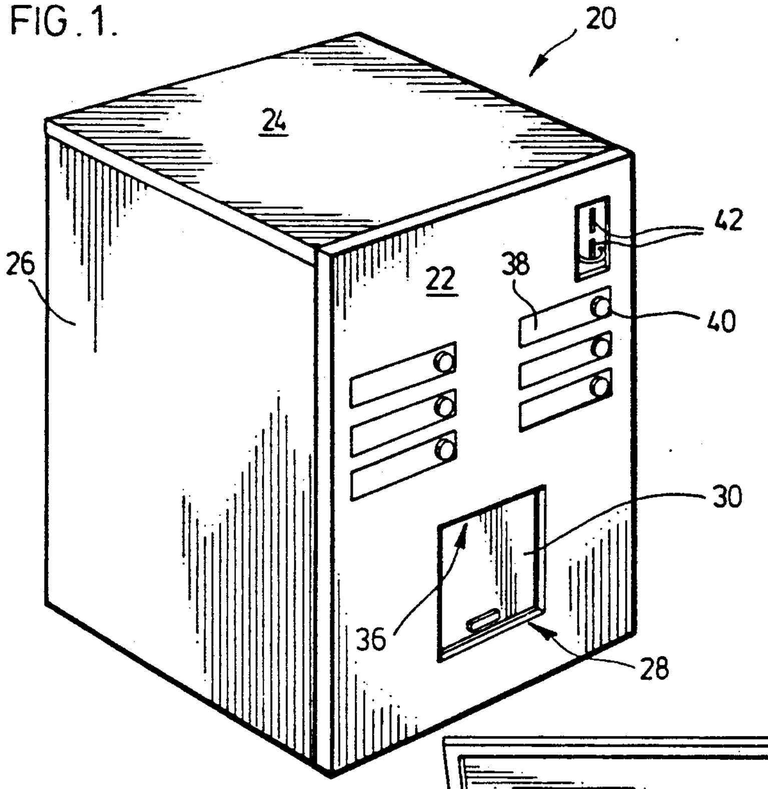
FIG. 1 is a perspective view of a beverage dispenser according to an embodiment of the invention.
Figure 1A:
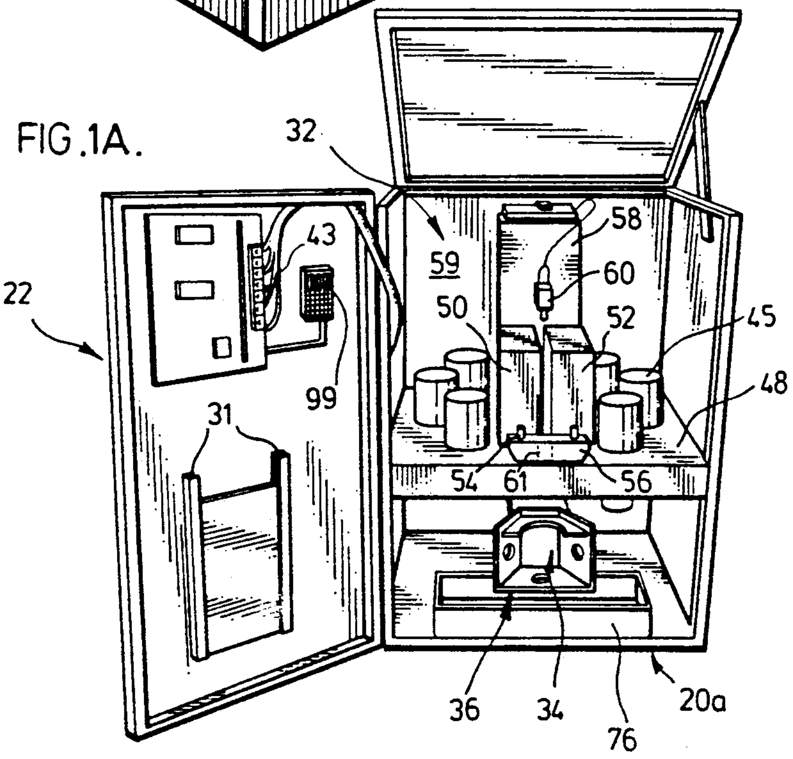
FIG. 1A is a perspective view of components within the compartment of the structure shown in FIG. 1.
Figure 6:
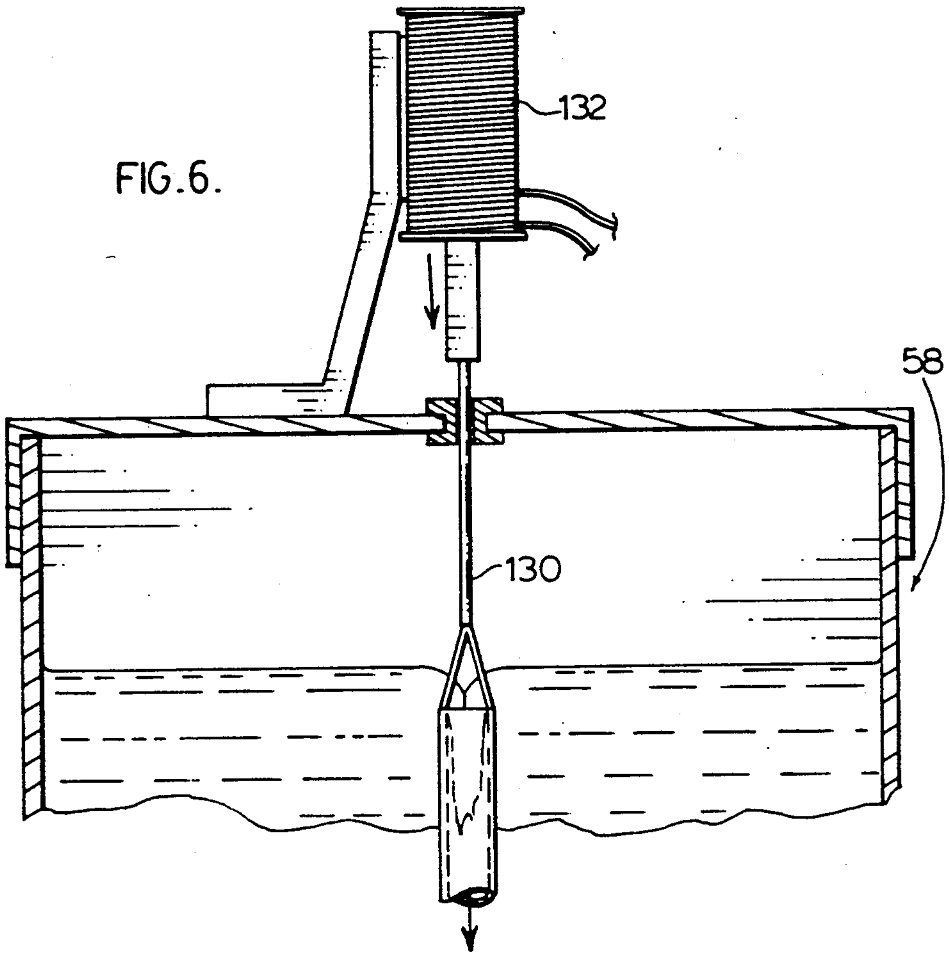
FIG. 6 is a close-up view of part of the mechanism shown in FIG. 5.

With reference to FIG. 1, there is disclosed beverage dispensing machine 20 comprising front door 22 and top, side, bottom and back walls, two of which are shown as 24 (top wall) and 26 (side wall). Door 22 has opening 28 therethrough covered by vertically slidable transparent door 30 for sliding vertically in channels 31 (see FIG. 2) to present access into compartment 32 (See FIG. 1A) to cup carrier 34 (see FIG. 1A), normally situate at discharge station 36 behind transparent door 30.

Front door 22 carries face plates 38, dispensing buttons 40 and coin slot 42, each plate 38 identifying the type of beverage to be dispensed by the machine by the depression of the adjacent buttons 40 after the deposition of the appropriate amount of money into coin slot 42.

The back of door 22 carries the appropriate electronics 43 for reacting to the depression of any button 40 and deposition of the requisite coins into slot 42, to activate the operation of the component parts of beverage dispenser machine 20 to provide a beverage in a cup in cup carrier 34 at discharge station 36.

Compartment 32 carries a plurality of cup dispenser mechanisms constructed in accordance with the teachings of U.S. patent application Ser. No. 291,465 radially spaced from a centre each carrying a stack of foam cups 45 with each cup carrying dry beverage ingredients for mixing with water.

Water heater 58 mounted on the back panel 59 of machine 20 and controlled by solenoid 60 is provided from which heated water is discharged directly downwardly by discharge outlet 61 (shown in FIG 1A), into the cup positioned by cup carrier 34 at discharge station 36.

Shelf 48 supports creamer and sugar cannisters 50 and 52, two augers (not shown) for discharging the ingredients from cannisters 50 and 52, one for each cannister with each auger driven by a separate motor (54 and 56) to discharge the ingredients carried by cannisters 50 and 52 into cups positioned at discharge station 36 in carrier 34. Drip tray 76 is provided for receiving overflow of both material and fluid.

Water heater 58 in prior art constructions shown in FIGS. 2, 3 and 4 carry seals 100 reciprocal from the top 102 of annular seat 104 of discharge 106 to a position spaced from it (See FIG. 3) to permit the water to be discharged through discharge 106. However constant heating of the water in the tank causes precipitation of lime (grit) onto seal 100 and annular seat 104 including top 102 thereof. Any grit becoming lodged between seal 100 and seat 104 destroys the seal and water passes through any opening causing drips. With references to FIG. 4, the shape of the seal has been altered to provide seal 100' carrying sloped peripheral sealing edge 101' angled to seat 102 so that engagement of sloped edge 101' with seat 102 creates a "wiping" action on the seat to remove the lime precipitate (grit). However the proposal was not entirely satisfactory.

With references to FIGS. 5 through 8 inclusive there is shown hot water tank 58 comprising bottom 120, side walls 122 and 124 and top 126 having aperture 128 through which rigid connector 130 passes between motor 132 mounted on support 134 on top 126 and flexible silicon dunk tube 136 which has a wall thickness of 1/16". Tube 136 has vertically opening mouth 138 and lower portion 140 below mouth 138 connected to metal conduit pipe 139 passing through aperture 142 and welded to wall 124 surrounding aperture 142. Conduit 139 is connected to flexible hose portion 140' which extends over cup station 36. Connector 130 is branched at its lower end to carry rigid arms 130A and 130B connected to tube 136 proximate mouth 138.

With reference to FIG. 5 mouth 138 is elevated above the water level 150. When motor 132 is activated connector 130 is activated and mouth 138 is lowered from the position in FIG. 8 to the submerged position shown in FIG. 7, so that water is permitted to enter mouth 138 and pass through tube 140, metal conduit pipe 139 and through flexible tube 140'. When mouth 138 of tube 136 is elevated from the position shown in FIG. 7 to the position shown in FIG. 8, flow of the water stops and the water (because of gravity) is evacuated from tube 136 (tube portion 140), conduit 139 and tube 140'. Because there is no seal but merely the raising of the mouth out of the hot water tank 58, to stop the flow of water, it is apparent, the hardness of the water is irrelevant.

Figure 7:
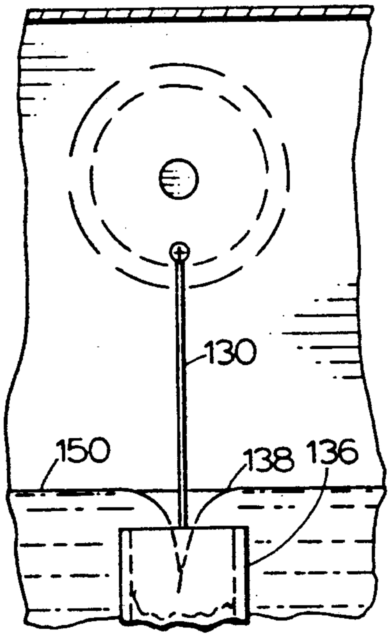
FIGS. 7 and 8 illustrate the raising and lowering of the mechanism.
Figure 8:
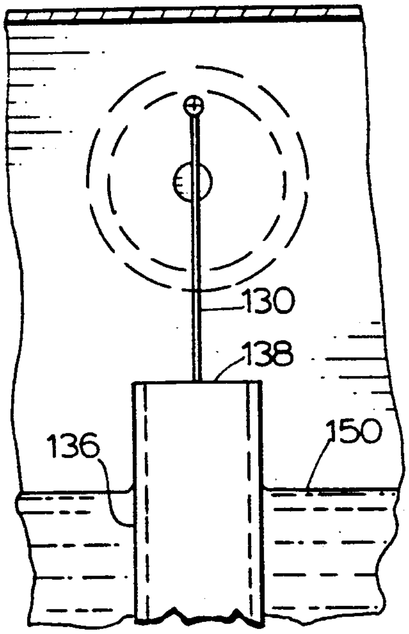

With reference to FIGS. 7 and 8, it is apparent that motor 132 operates connector 130 in a circular motion raising and lowering the tube. (Simple harmonic motion may be used to elevate tube 136 vertically on a line. Thus circular motion may by projection of the motion of a point on the circle onto a diameter, be translated to vertical linear motion).

Figure 9:
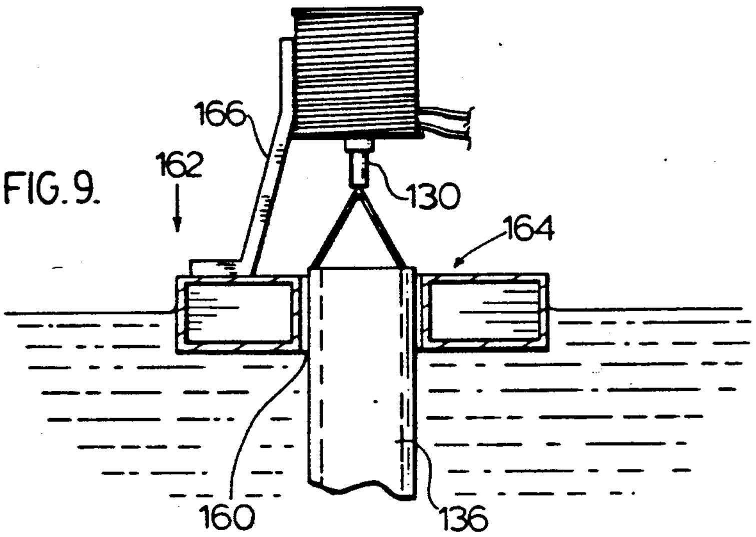
FIG. 9 is a close-up side view of another embodiment of the invention.

With reference to FIG. 9, dunk valve tube 130 may be secured to slide vertically in a circular opening 160 through a float 162 comprising an annular block 164 either carrying a sealed volume of air or buoyant material (e.g. styrofoam). Float 162 carries support 166 supporting motor 132 and connector 130 for elevating and lowering tube 136 through annular block 164 into and out of the water.

Figure 10:
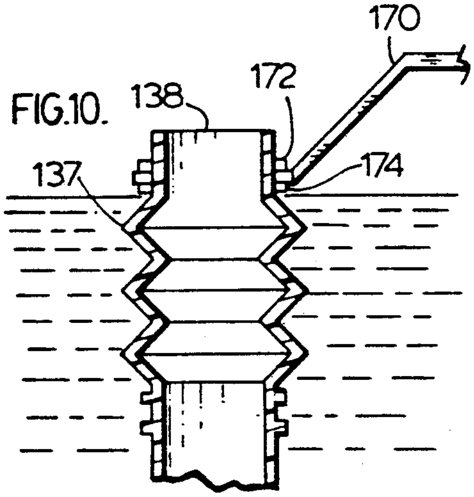
FIGS. 10 and 11 illustrate the operation of another embodiment of the invention.
Figure 11:
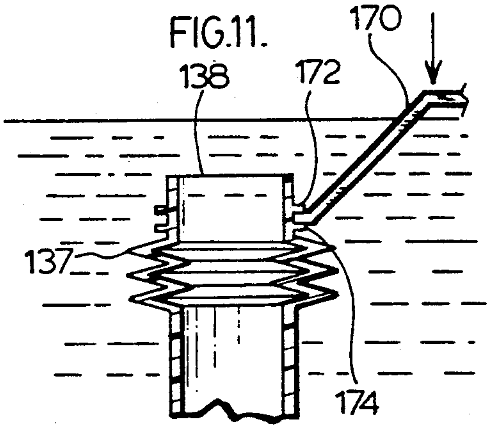

With reference to FIGS. 10 and 11, tube 136 has been modified to provide an accordion configuration 137 proximate mouth 138 and tube 136 is connected to bent rod 170 positioned between annular spaced rings 172 and 174. As bent rod 170 is raised and lowered accordion portion 137 is elongated (See FIG. 10) and compressed (See FIG. 11) elevating mouth 138 from above the level of the water to a position submerged under the water.

Figure 12:
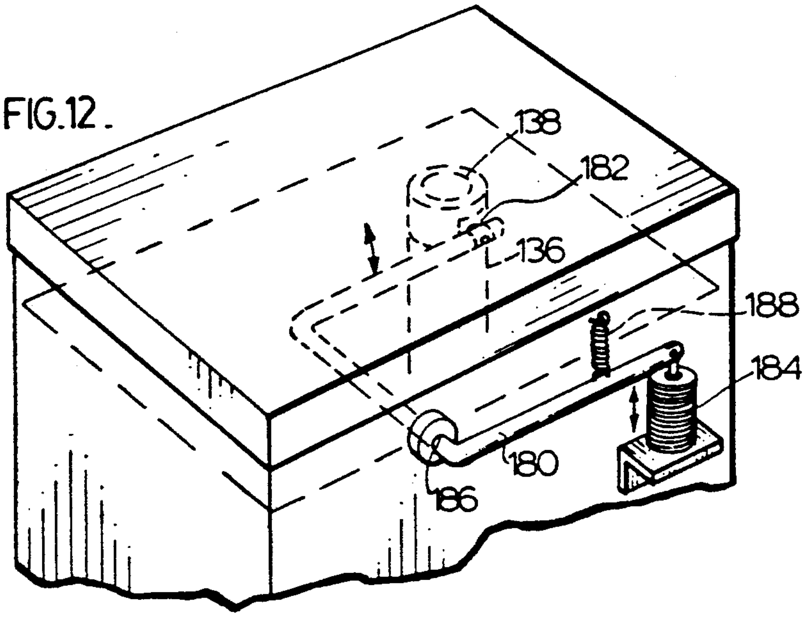
FIGS. 12 and 13 illustrate other embodiments of the invention used in hot water tanks.

With reference to FIG. 12, hot water tank 58 carries U-shaped rod 180 passing through wall 122 and is secured to tube 130 proximate mouth 138 at 182. Solenoid 184 pivots rod 180 about point 186 raising and lowering mouth 138 of tube 136. In the event solenoid 184 becomes inoperative, spring 188 is provided to return rod 180 to a position whereat mouth 138 is elevated out of the hot water. Thus when solenoid 184 is activated to rotate rod 180 to move down thus submerging mouth 138, spring 188 is stretched. This solenoid must also overcome the restorative force of the action of spring 188 on rod 180 and thus mouth 138. If solenoid 184 ceases operation when mouth 138 is submerged, solenoid 184 is neutralized and spring 188 returns to its unstretched condition, elevating mouth 138 above the water.

Figure 13:
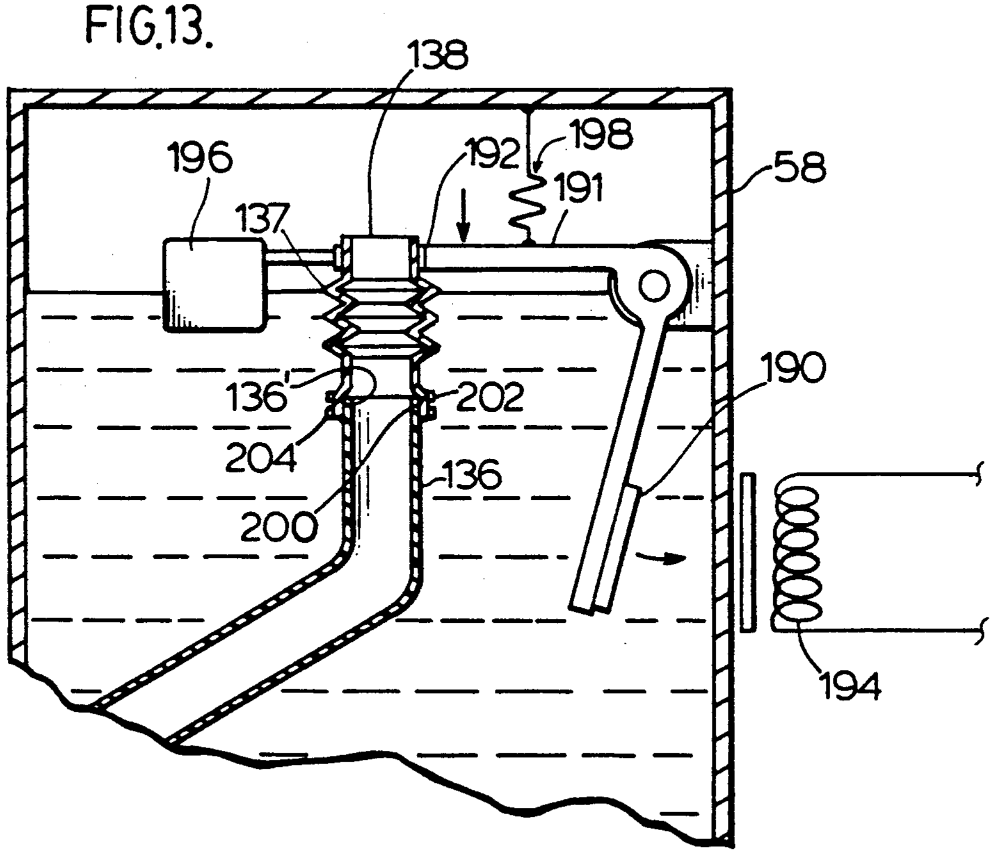

With reference to FIG. 13, where it is desired to minimize the number of holes in hot water tank 58, magnetic material 190 may be provided on the end of pivoted V-shaped ar 191 (the other end 192 of which is connected to tube 136 proximate accordion portion 137) and electromagnet 194 may be provided outside tank 58. When it is desired to submerge mouth 138, electromagnet 194 is activated, attracting material 190, rotating arm 192 counterclockwise, submerging mouth 138 of tube 136 compressing accordion portion 137. When mouth 138 is to be elevated, electromagnet 194 is shut off and arm 191 is elevated (for example being buoyed upwardly by float 196 or being returned by spring 198). It is also apparent in this embodiment that accordion portion 137 is formed from a rubberized flexible material the end 200 of which is fitted the upper end 136' of bent steel tube 136. Annular rings 202 and 204 clamp end 200 around upper end 136'. Annular rings 172' and 174' support end 192 of arm 191 to the upper end of accordion portion 137.

Where in some embodiments the mouth of a tube is submerged quickly it may create a vortex and water flowing therein could also include some air passed with the water into the mouth where such a result may be suitable for use in vending equipment dispensing drinks, soups and the like from a reservoir. This may not be ideal for an in cup system when adding a premeasured amount of water to a cup containing a premeasured amount of ingredients when consistency is a desire.

Thus with reference to FIGS. 14 to 21 various embodiments carrying mouths have been illustrated which mouths have been protected according to embodiments of the invention should the creation of a vortex be of concern.

Figure 14:
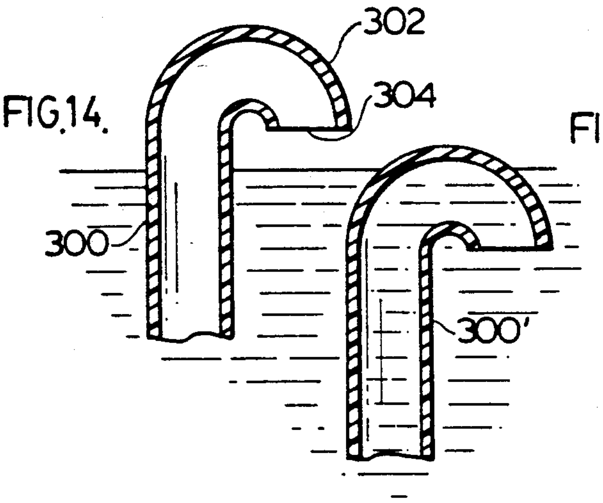

With reference to FIG. 14, the upper portion of tube 300 is shown carrying on the top thereof a curved arcuate portion 302 having vertically oriented mouth 304 directed to open downwardly so that when submerged as at 300' in FIG. 14, water flows into mouth 304 through curved portion 302 and down to 300 to the discharge end for example as previously shown.

Figure 15:
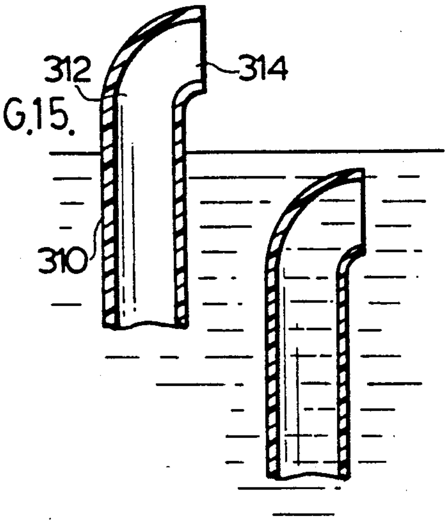

FIG. 15 illustrates the use of a tube 310 on the top of which is disposed arcuate tubular portion 312 whose mouth 314 opens laterally.

Figure 16A:
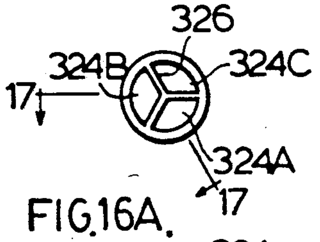
Figure 16:
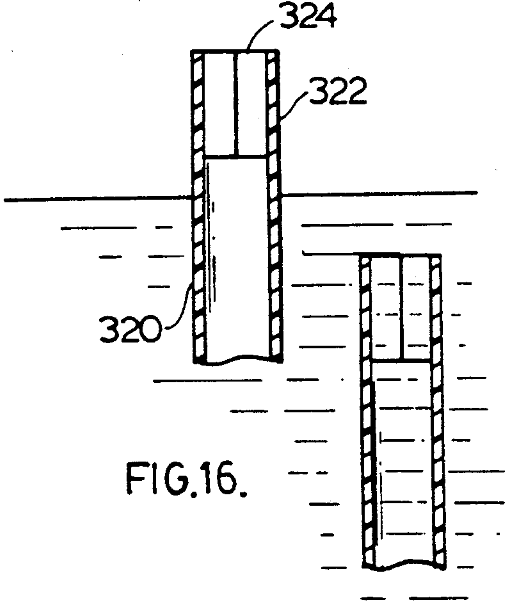

FIG. 16 shows the use of a tube 320 comprising vertically opening mouth 324 protected by segmented upper portion 322 divided by divider walls 326 (shown in FIG. 16A) which when submerged quickly will permit the water to flow smoothly through the mouth through segmented mouth portions 324A, 324B, and 324C seen in FIG. 16A.

Figure 17A:
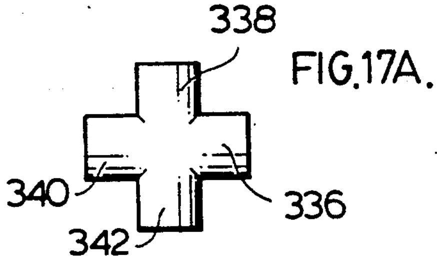
Figure 17:
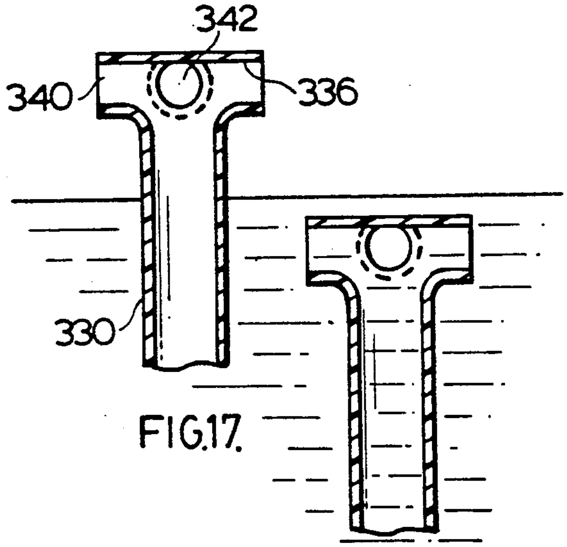

FIG. 17 carries tube 330 carrying at its upper end cross-shaped (see FIG. 17A) top plan view of the top structure of tube 330 which carries four laterally opening tubes comprising four laterally opening tube portions 336, 338, 340 and 342 (see FIG. 17A) each of which feeds the tube 330 with water collected by each of portions 336, 338, 340 and 342 (shown in FIG. 17).

Figure 18:
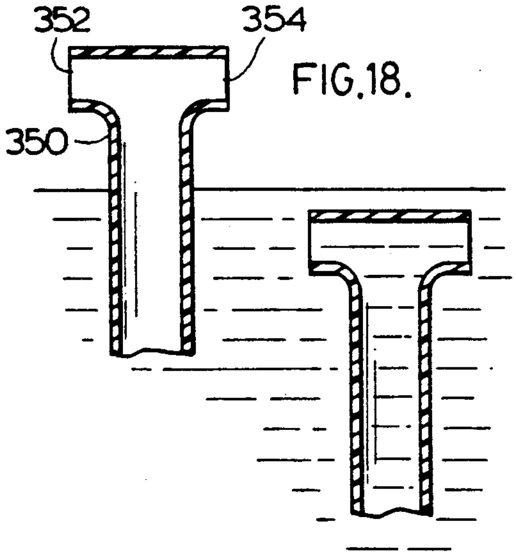

FIG. 18 is a cross-sectional view of a tube, tube 350 having laterally opening tubular portions 352 and 354 comprising the mouth through which water may enter when the tube 350 is submerged as shown in FIG. 18.

Figure 19:
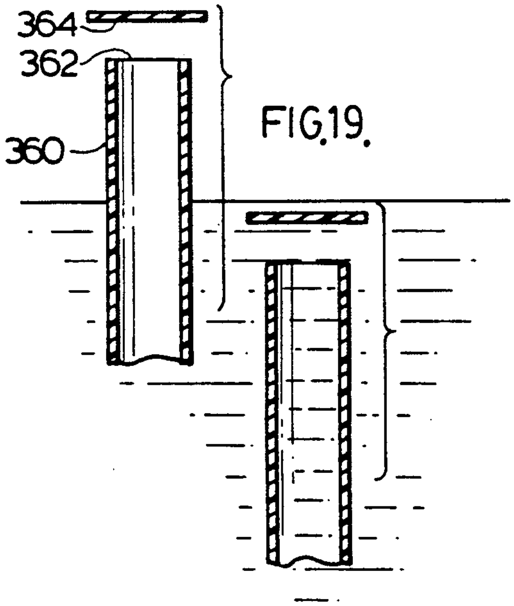

FIG. 19 shows tube 360 having mouth 362 opening upwardly and covered a predetermined distance thereabove by a disk or mushroom 364 carried above mouth 362 for the elimination of the effects of the vortex.

Figure 20:
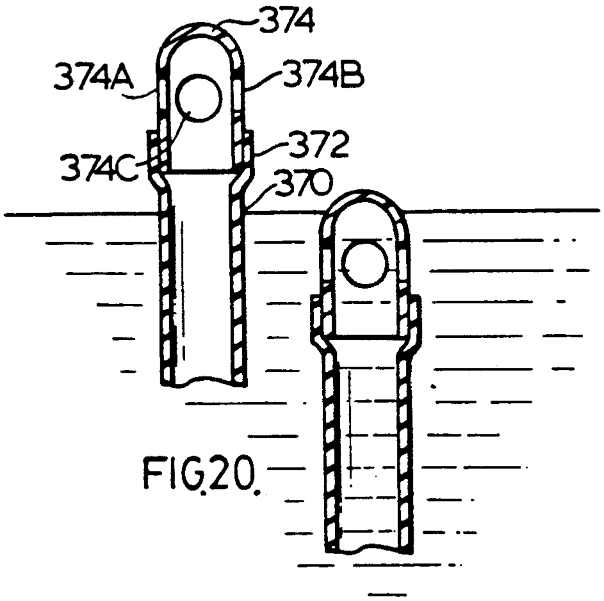
Figure 21C:
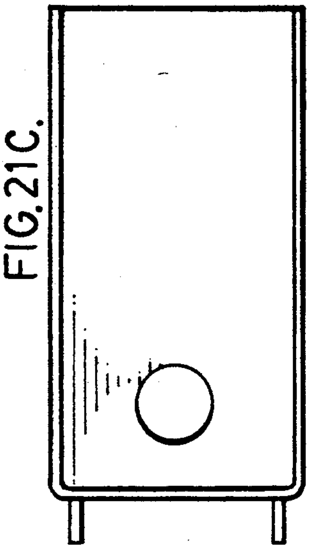
FIGS. 21A, 21B, 21C and 21D illustrates the use of another mouth opening into a pivotable scoop whose end is raised or lowered into the fluid.
Figure 21D:
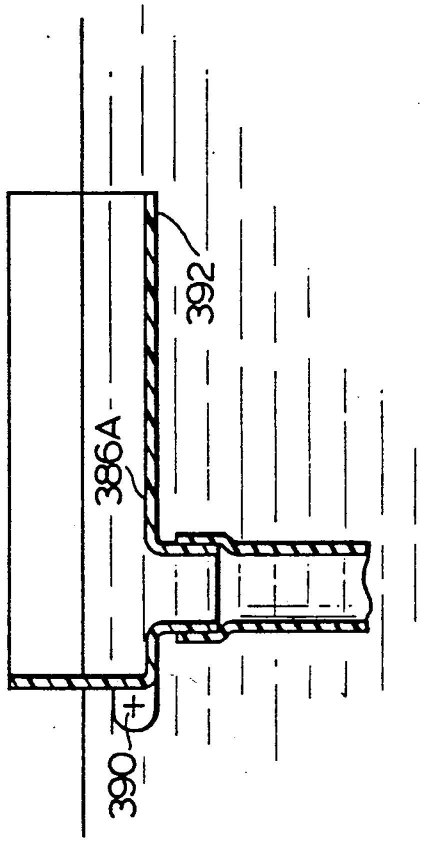
Figure 21A:
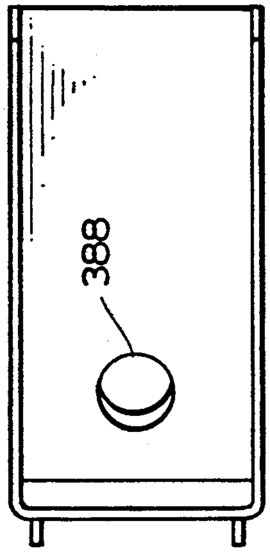
Figure 21B:
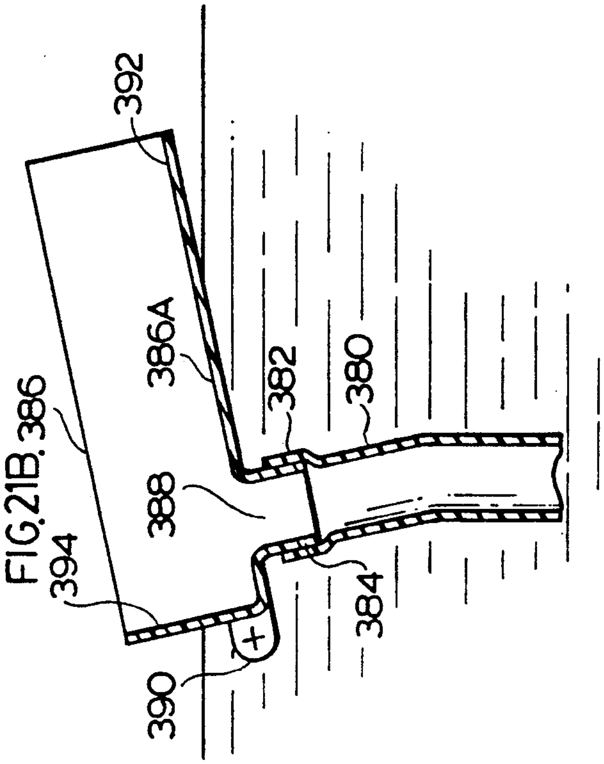

FIG. 20 is a cross-sectional view taken through tube 370 carrying enlarged mouth portion 372 securing cover 374 carrying four openings into cover 374 disposed at right angles to one another namely 374A, 374B, 374C and 374D (not shown) so that when tube 370 is submerged any vortexes created will have minimal effect on the entry of the water because of the disposition of the protected openings comprising a mouth through which the water may enter.

With respect to FIG. 21, there is shown tube 380 carrying enlarged portion 382 carrying down spout 384 secured in enlarged portion 382 connected to a scoop 386 from which opening 388 extends into spout 384. Scoop 386 is pivoted at 390 for raising the scoop end 392 above the water line as shown on the right hand drawing, permitting the water to flow along the bottom 386A to spout 384 into tube 380 for discharge. Vertical peripheral wall 394 surrounds plate bottom 386A for precluding the water from rushing down opening 388 through spout 384 into tube 380 for discharge because it surrounds plate 386A on three sides only (see top plan view of FIG. 21) and is opened at end 392 so that water can flow onto plate 386A at end 392 when end 392 is lower into the water permitting the water to flow through opening 388 and tube 380.

As many changes can be made to the embodiments without departing from the scope of the invention, it is intended that all matter contained herein be interpreted as illustrative thereof and not in a limiting sense.

The embodiments of the invention in which an exclusive property or privilege is claimed are as follows:

1. A dunk valve mechanism suitable for use for transferring fluids and fluidized material from storage, the mechanism comprising a tube having an outlet and a mouth, the mouth being moveably secured with the dunk valve mechanism and reciprocal from a position spaced from the fluid or fluidized material to a position submerged within the fluid or fluidized material as the case may be, and means to reciprocate the mouth of the tube from the position spaced from the fluid or fluidized material to the position submerged within the fluid or fluidized material, the outlet being lower or below the mouth when the mouth is submerged within the fluid or fluidized material, wherein the tube comprises a flexible material in at least a portion thereof so that submerging of the mouth displaces the portion of the tube comprising the flexible material without affecting the flow of fluid or fluidized material from the mouth of the outlet.

2. The valve mechanism of claim 1 wherein the mouth is oriented in a vertical direction.

3. The valve mechanism of claim 2 wherein the flow of fluid or fluidized material is accomplished by the means to reciprocate the mouth of the tube from a position spaced from the fluid to the position submerged within the fluid further comprising a substantially vertical displacement of the mouth of the tube and thus using gravity with the fluid or fluidized material entering the mouth and exiting from the outlet permitting the tube to be evacuated.

4. The valve mechanism of claim 1, or 2 wherein the tube is silicon.

5. The valve mechanism of claim 1 wherein the flow of fluid or fluidized material is accomplished by the means to reciprocate the mouth of the tube from a position spaced from the fluid to the position submerged within the fluid further comprising a substantially vertical displacement of the mouth of the tube and thus using gravity with the fluid or fluidized material entering the mouth and exiting from the outlet permitting the tube to be evacuated.

6. The valve mechanism of claim 5, or 3 wherein the tube is silicon.

7. The mechanism of claim 5 wherein the tube includes in its length a collapsible section which when the mouth is submerged the collapsible section collapses on itself, and expands or elongates when the mouth is raised from the fluid or fluidized material.

8. The mechanism of claim 1 wherein the tube includes in its length a collapsible section which when the mouth is submerged the collapsible section collapses on itself, and expands or elongates when the mouth is raised from the fluid or fluidized material.

9. The valve mechanism of claim 1 wherein the mouth is protected by vortex effect minimizing means provided therewith to minimize the effects of any vortex in the fluid introducing air into the mouth.

10. A vending machine for delivering hot beverages, the vending machine comprising a hot water tank, the hot water tank comprising means to heat the water and a dunk valve mechanism comprising a tube having an outlet and a mouth, the mouth being moveably secured with the dunk valve mechanism and reciprocal from a position spaced from the fluid or fluidized material to a position submerged within the fluid or fluidized material as the case may be, and means to reciprocate the mouth of the tube from the position spaced from the fluid or fluidized material to the position submerged within the fluid or fluidized material, the outlet being lower or below the mouth when the mouth is submerged within the fluid or fluidized material.

11. The machine of claim 10 wherein magnetic material is secured to the tube and magnetic means are provided with the vending machine to cause the magnetic material to be moveable by the magnetic means thus causing movement of the tube in a predetermined manner to reciprocate the mouth of the tube from a position spaced from the fluid or fluidized material to a submerged position whereby the hot water tank of the vending machine is to have minimal components passing through the walls thereof.

12. The vending machine of claim 10 wherein automatic raising means are provided for automatically raising the tube mouth from a submerged position in the event the means for reciprocating the mouth of the tube cannot return the mouth to a raised position when the mouth of the tube is reciprocated to a submerged position.

13. The vending machine of claim 12 wherein the automatic raising means for the mouth is a spring secured with the mouth and the hot water tank which constantly urges the mouth to be raised from the fluid or fluidized material.

14. The vending machine of claim 10 wherein the dunk valve mechanism further comprises a float assembly which floats on the surface of the fluid or fluidized material and supports the reciprocal motion of the mouth.

15. The machine of claim 10 securing means are provided wherein the dunk valve is held on the surface of the fluid or fluidized material by the securing means and yet the mouth may be dunked from the raised position on the surface of the fluid or fluidized material.

16. A vending machine for delivering hot beverages, the vending machine comprising a hot water tank, the hot water tank comprising means to heat the water and a dunk valve mechanism comprising a tube having an outlet and a mouth, the mouth being moveably secured with the dunk valve mechanism and reciprocal from a position spaced from the fluid or fluidized material to a position submerged within the fluid or fluidized material as the case may be, and means to reciprocate the mouth of the tube from the position spaced from the fluid or fluidized material to the position submerged within the fluid or fluidized material, the outlet being lower or below the mouth when the mouth is submerged within the fluid or fluidized material, wherein the flow of fluid or fluidized material is accomplished by the means to reciprocate the mouth of the tube from a position spaced from the fluid to the position submerged within the fluid further comprising a substantially vertical displacement of the mouth of the tube and thus using gravity with the fluid or fluidized material entering the mouth and exiting from the outlet permitting the tube to be evacuated.

17. The machine of claim 16 wherein magnetic material is secured to the tube and magnetic means are provided with the vending machine to cause the magnetic material to be moveable by the magnetic means thus causing movement of the tube in a predetermined manner to reciprocate the mouth of the tube from a position spaced from the fluid or fluidized material to a submerged position whereby the hot water tank of the vending machine is to have minimal components passing through the walls thereof.

18. The vending machine of claim 16 wherein automatic raising means are provided for automatically raising the tube mouth from a submerged position in the event the means for reciprocating the mouth of the tube cannot return the mouth to a raised position when the mouth of the tube is reciprocated to a submerged position.

19. The vending machine of claim 18 wherein the automatic raising means for the mouth is a spring secured with the hot water tank which constantly urges the mouth to be raised from the fluid or fluidized material.

20. The machine of claim 16 wherein the dunk valve mechanism further comprises a float assembly which floats on the surface of the fluid or fluidized material and supports the motion of the reciprocal the mouth.

21. The machine of claim 16 securing means are provided wherein the dunk valve is held on the surface of the fluid or fluidized material by the securing means and yet the mouth may be dunked from the raised position on the surface of the fluid or fluidized material.

* * * * *